Nov. 17, 1925.  1,562,169
W. HEFTI
DEVICE FOR THE ADMISSION OF AIR TO INTERNAL COMBUSTION
ENGINES ON BOARD SHIPS
Filed Oct. 12, 1923   2 Sheets-Sheet 1

INVENTOR
Wilhelm Hefti

Patented Nov. 17, 1925.

1,562,169

UNITED STATES PATENT OFFICE.

WILHELM HEFTI, OF WULFLINGEN, SWITZERLAND, ASSIGNOR TO THE FIRM OF GEBRÜDER SULZER AKTIENGESELLSCHAFT AT WINTERTHUR.

DEVICE FOR THE ADMISSION OF AIR TO INTERNAL-COMBUSTION ENGINES ON BOARD SHIPS.

Application filed October 12, 1923. Serial No. 668,128.

*To all whom it may concern:*

Be it known that I, WILHELM HEFTI, a citizen of Switzerland, residing at Wulflingen, Switzerland, Oberfeld 828, have invented certain new and useful Improvements in Devices for the Admission of Air to Internal-Combustion Engines on Board Ships, of which the following is a specification.

The invention relates to a system for admitting air to internal combustion engines on board ships, and comprises means for causing the air, before it enters the engine, to be led through a large chamber arranged in the interior of the ship, the walls of the chamber forming part of the ship's construction. The air flowing through the chamber changes its direction at least once, not only to avoid water and foreign bodies being carried over into the engines, but also to silence the noise made by the suction air and to furnish proper means for equalizing fluctuations and sudden variations of pressure, principally in the case of large reciprocating internal-combustion engines. The chamber within the ship may be connected to several air-admission pipes. When using two-stroke cycle internal-combustion engines with a turbo-blower supplying the scavenging air the turbo blower may be fitted directly on the chamber or even in it, the driving motor in the latter case being outside the chamber or inside it.

It is often desirable to connect the chamber not only to the outside air but also to one or more spaces within the ship in order to ventilate them. In the air pipe leading to the outside air a regulating member may also be fitted. On the inlet end of this pipe it is desirable to fit a subsidiary chamber through which the air passes upwards, in order to prevent rain water finding its way into the piping. This subsidiary chamber is preferably located into the smoke stack by which the exhaust gases from the internal combustion engines are led away, and the inlet to the subsidiary chamber may advantageously be fitted with a kind of louver.

Several constructions according to the invention are illustrated by way of example in the accompanying drawings.

Figure 1:
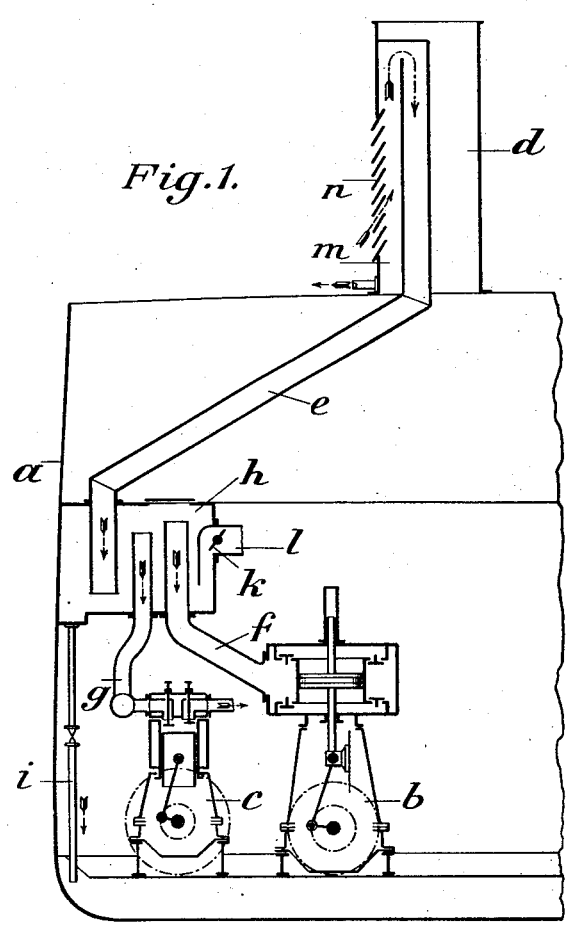
Figs. 1 and 2 are cross-sections through the ship, showing more or less diagrammatically alternative forms of the systems.

*a* is the hull of the ship, *b* the scavenging-air pump which supplies air for scavenging the cylinders of an internal-combustion engine working on the two-stroke cycle and used for propelling the ship, *c* an auxiliary internal-combustion engine, of the type usually employed on motorships, (the auxiliary engine shown in Fig. 1 is a four-stroke cycle engine); *d* is a smoke stack through which the exhaust gases from the internal-combustion engine escape to the atmosphere; *e*, *f* and *g* are air pipes, by means of which the air is drawn into the internal combustion engines.

In accordance with the invention, a chamber or air tank *h* is fitted between the pipe *e* and the pipes *g* and *f*. The arrangement is such that the pipe *e* opens in the lower part of the chamber and the pipes *g* and *f* in the upper part, so that the air is compelled to flow upwards through the chamber. Because of the increase in cross-section in the passage through which the combustion-air flows, and also because of the sudden change in the direction of flow effected at the same time in the chamber, it is possible, not only to silence the suction air effectively, but also to prevent water and foreign bodies from entering the engines. The water that collects may be drained off by the piping *i* fitted with a valve and leading to the bilge.

An adjustable throttle *k* is fitted in an opening *l* in the wall of the chamber *h*, and this enables a part of the air, regulated as desired, to be taken from the engine room to ventilate the same. The chamber can of course be connected up to other parts of the interior of the ship for the same purpose. The connection of the pipe *e* to the outside air is effected through another chamber (subsidiary chamber) *m*, located in the smoke stack. The air passes upwards through this chamber, entering it through a louver *n*, the slats of which project over each other so as to prevent rain water being admitted.

Figure 2:
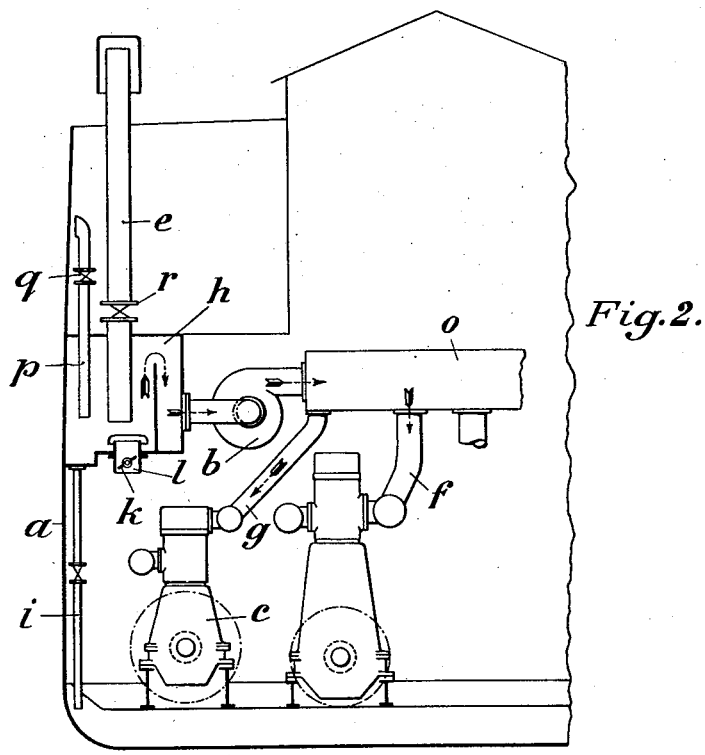

In the construction illustrated by way of example in Fig. 2, the auxiliary internal-combustion engine also is constructed as a two-stroke cycle engine, and scavenging air is supplied to the two engines by a turbo blower *b* which delivers the air drawn from the chamber *h* into a receiver *o*, common to all the internal-combustion engines in the installation. From the reservoir the air passes through pipes *g* and *f* to individual parts of the engines. *p* is a ventilating pipe leading to another part of the ship and fitted with a regulating member *q* for controlling the amount of ventilation. For increasing the amount of ventilation, in addition to the regulating members *k* and *q*, a further regulating member *r* is fitted in the pipe *e*, and this is closed more or less, according to the amount of combustion air drawn from the interior of the ship.

Figures 3, 4:
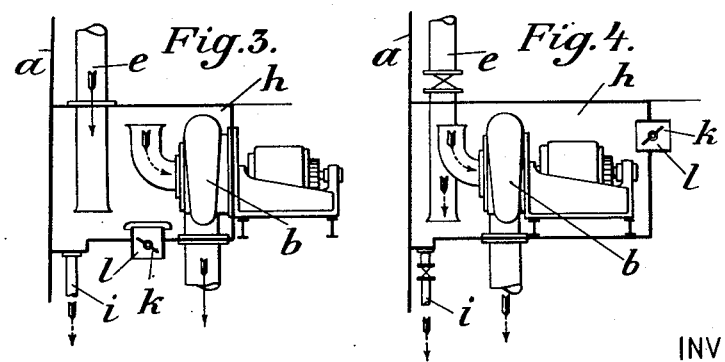
Figs. 3 and 4 are detailed views showing alternative methods of fitting the turbo blower.

In the construction illustrated by way of example in Fig. 3, the turbo blower *b* is arranged inside the chamber *h* and the electric motor driving it is outside the chamber. The motor, as well as the turbo blower may, however, also be arranged within the chamber, as shown in Fig. 4.

I claim:

1. An air supply system for internal combustion engines on board ships comprising an air supply conduit for conducting air from an inlet to the engine, a relatively large air tank located in the interior of the ship and interposed between the inlet and the engine, said tank being of fixed capacity and having a sectional area materially larger than the sectional area of said conduit, stationary means in said tank for causing the air to change its direction of motion as it passes through the tank whereby the tank serves as a silencer and also to arrest dust and water and to equalize fluctuations and sudden variations in the air pressure, and a plurality of air admission pipes associated with said tank and leading to different portions of the ship to ventilate the same.

2. In an air supply system for internal combustion engines the combination with an air conduit for conducting air from an inlet to the engine, of a relatively large air tank of fixed capacity interposed between the inlet and the engine, said tank having a sectional area materially larger than the sectional area of said conduit, and stationary means in said tank for causing the air to change its direction of motion as it passes through the tank whereby the tank serves as a silencer and also to arrest dust and water and to equalize fluctuations and sudden variations in the air pressure, a rotary blower located within said tank for supplying scavenging air to the engine and a driving motor operatively connected with said blower.

3. An air supply system for internal combustion engines on board ships comprising an air supply conduit for conducting air from an inlet to the engine, a relatively large air tank located in the interior of the ship and interposed between the inlet and the engine, said tank being of fixed capacity and having a sectional area materially larger than the sectional area of said conduit, stationary means in said tank for causing the air to change its direction of motion as it passes through the tank whereby the tank serves as a silencer and also to arrest dust and water and to equalize fluctuations and sudden variations in the air pressure, and a plurality of air admission pipes associated with said tank and leading to different portions of the ship to ventilate the same, said air conduit having a regulating device located between the inlet and said tank.

4. In an air supply system for internal combustion engines in addition to the usual devices for silencing purposes for, excluding rain, dust and extraneous matter, the combination with an air conduit for conducting air from said devices to the engine, of a relatively large air tank of fixed capacity interposed between the air inlet and the engine, said tank having a sectional area materially larger than the sectional area of said conduit, and means in said tank for causing the air to change its direction of motion as it passes through the tank, the size of said tank being large enough to enable it to equalize fluctuations and sudden variations in the air pressure.

5. In an air supply system for internal combustion engines on board ships, in addition to the usual devices for silencing purposes, for excluding rain, dust and extraneous matter, the combination with an air conduit for conducting air from said devices to the engine, of a relatively large air tank of fixed capacity interposed between the air inlet and the engine, said tank having a sectional area materially larger than the sectional area of said conduit, and at least some of its walls forming part of the ships construction, means in said tank for causing the air to change its direction of motion as it passes through the tank, the size of said tank being large enough to enable it to equalize fluctuations and sudden variations in the air pressure.

6. An air supply system for internal combustion engines on board ships, in addition to the usual devices for silencing purposes, for excluding rain, dust and extraneous matter, comprising an air supply conduit for conducting air from the said devices to the engine, a relatively large air tank located in the interior of the ship and interposed between the inlet and the engine, said tank being of fixed capacity and having a sectional area materially larger than the sectional area of said conduit, stationary means in said tank for causing the air to change its direction of motion as it passes through the tank, the size of said tank being large enough to enable it to equalize fluctuations and sudden variations in the air pressure, an air pump connected thereto and a plurality of air admission pipes associated with said tank and leading to the interior of the ship to ventilate different parts of the same.

7. In an air supply system for internal combustion engines on board ships, in addition to the usual devices for silencing purposes, for excluding rain, dust and extraneous matter, the combination with an air conduit for conducting air from an inlet to the engine, of a relatively large air tank of fixed capacity interposed between the inlet and the engine, said tank having a sectional area materially larger than the sectional area of said conduit, and stationary means in said tank for causing the air to change its direction of motion as it passes through the tank, the size of said tank being large enough to enable it to equalize fluctuations and sudden variations in the air pressure, and a rotary blower associated directly with said tank and communicating with the interior thereof for supplying scavenging air from the tank to the engine.

8. In an air supply system for internal combustion engines on board ships, in addition to the usual devices for silencing purposes, for excluding rain, dust and extraneous matter, the combination with an air conduit for conducting air from an inlet to the engine, of a relatively large air tank of fixed capacity interposed between the inlet and the engine, said tank having a sectional area materially larger than the sectional area of said conduit, and stationary means in said tank for causing the air to change its direction of motion as it passes through the tank, the size of said tank being large enough to enable it to equalize fluctuations and sudden variations in the air pressure, a rotary blower located within said tank for supplying scavenging air to the engine and a driving motor operatively connected with said blower.

9. An air supply system for internal combustion engines on board ships, in addition to the usual devices for silencing purposes, for excluding rain, dust and extraneous matter, comprising an air supply conduit for conducting air from the said devices to the engine, a relatively large air tank located in the interior of the ship and interposed between the inlet and the engine, said tank being of fixed capacity and having a sectional area materially larger than the sectional area of said conduit, stationary means in said tank for causing the air to change its direction of motion as it passes through the tank, the size of said tank being large enough to enable it to equalize fluctuations and sudden variations in the air pressure, an air pump connected to and a plurality of air admission pipes associated with said tank and leading to the interior of the ship to ventilate different parts of the same, a throttle valve being located between the air inlet and said tank, and throttle valves between said tank and the pipes leading to the interior of the ship.

In testimony whereof I have affixed my signature.

WILHELM HEFTI.